United States Patent [19]
Nickless

[11] Patent Number: 5,859,953
[45] Date of Patent: Jan. 12, 1999

[54] ELECTRIC HEATING APPARATUS FOR DEICING PIPES UTILIZING FLEXIBLE HEATED HOSE INSERTED INTO PIPE

[76] Inventor: Eugene R. Nickless, Box 84 Islay, Alberta, Canada, T0B 2J0

[21] Appl. No.: 885,526

[22] Filed: Jun. 30, 1997

[51] Int. Cl.⁶ .................................................. F16L 53/00
[52] U.S. Cl. .............................. 392/489; 219/523; 138/33
[58] Field of Search ........................................ 392/472, 488, 392/489, 480; 219/523, 528, 549; 138/33; 285/41, 31

[56] References Cited

U.S. PATENT DOCUMENTS

| | | | |
|---|---|---|---|
| 1,873,820 | 8/1932 | Carpenter | 392/489 |
| 2,516,950 | 8/1950 | Bragg | 219/523 |
| 2,877,630 | 3/1959 | Schultz | 392/489 |
| 3,275,803 | 9/1966 | True | 219/535 |
| 3,293,407 | 12/1966 | Ando | 392/488 |
| 3,329,803 | 7/1967 | Sink | 392/488 |
| 3,754,118 | 8/1973 | Booker | 219/523 |
| 4,359,627 | 11/1982 | Takeichi | 392/488 |
| 4,423,311 | 12/1983 | Varney, Sr. | 392/468 |
| 5,182,792 | 1/1993 | Goncalves | 392/489 |

FOREIGN PATENT DOCUMENTS

| | | | |
|---|---|---|---|
| 4307371 | 9/1994 | Germany . | |
| 102497 | 9/1963 | Norway | 392/488 |
| 398589 | 9/1933 | United Kingdom | 392/489 |

Primary Examiner—John A. Jeffery

[57] ABSTRACT

A electric heating apparatus for de-icing pipes includes a flexible hose with a closed bottom end and a top end. The hose has a pair of insulated wires situated within an interior of the hose and a plug coupled to the top end of the hose. The plug has a pair of contacts connected to the wires and adapted to be inserted within a conventional electrical receptacle for providing electrical power to the wires. By this structure, the hose is adapted to be passed within a pipe connected to a source of water. Next provided is a thermostat having an input connected to the insulated wires and is adapted to allow the transfer of power to an output thereof upon the detection of a temperature below a predetermined degree. The thermostat is situated within the interior of the hose adjacent the bottom end thereof. Also included is a heating coil formed within the hose, wherein the coil is connected to the output of the thermostat for radiating heat upon the receipt of power. Finally, a lead weight is coupled to the hose at the bottom end thereof for facilitating the passing of the hose through the pipe.

1 Claim, 3 Drawing Sheets

ELECTRIC HEATING APPARATUS FOR DEICING PIPES UTILIZING FLEXIBLE HEATED HOSE INSERTED INTO PIPE

BACKGROUND OF THE INVENTION

1. Field of the Invention

The present invention relates to a electric heating apparatus for de-icing water pipes and more particularly pertains to obtaining a temperature within the water pipes when de-icing.

2. Description of the Prior Art

The use of pipe de-icers is known in the prior art. More specifically, pipe de-icers heretofore devised and utilized for the purpose of preventing pipes from freezing are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,423,311 to Varney, Sr.; U.S. Pat. No. 4,848,389 to Pirkle; U.S. Pat. No. 5,182,792 Goncalves; U.S. Pat. No. 4,124,039 to St. Laurent; U.S. Pat. No. 5,193,587 to Miller, Jr.; and U.S. Pat. No. 4,575,614 to Hughes.

In this respect, the electric heating apparatus for de-icing pipes according to the present invention substantially departs from the conventional concepts and designs of the prior art, and in so doing provides an apparatus primarily developed for the purpose of obtaining a temperature within the pipes when de-icing.

Therefore, it can be appreciated that there exists a continuing need for a new and improved electric heating apparatus for de-icing pipes which can be used for obtaining a temperature within the pipes when de-icing. In this regard, the present invention substantially fulfills this need.

SUMMARY OF THE INVENTION

In view of the foregoing disadvantages inherent in the known types of pipe de-icers now present in the prior art, the present invention provides an improved electric heating apparatus for de-icing pipes. As such, the general purpose of the present invention, which will be described subsequently in greater detail, is to provide a electric heating apparatus for de-icing pipes which has all the advantages of the prior art and none of the disadvantages.

To attain this, the present invention essentially comprises a housing including a rigid primary linear conduit with a first diameter and a cylindrical configuration. As shown in FIGS. 1 & 3, the primary conduit of the housing has a circular top open end with a first coupling means positioned thereon for coupling to a first pipe. The primary conduit further has a circular bottom open end with a second coupling means positioned thereon for coupling with a second pipe connected to a source of water. The housing further includes a rigid secondary linear conduit integrally coupled to a central extent of the primary linear conduit and forming an acute angle with a top portion of the primary linear conduit. The secondary linear conduit has a second diameter less than the first diameter. An open top of the secondary conduit includes an exterior periphery with a plurality of coaxial threaded grooves formed therein. As shown in FIGS. 3–5, a flexible hose is provided with a closed bottom end and a top end. The hose has a pair of insulated wires situated within a central axial interior of the hose and extended from the top end of the hose to a point adjacent the bottom end thereof. A plug is coupled to the top end of the hose with a pair of contacts connected to the wires. Such contacts are adapted to be inserted within a conventional electrical receptacle for providing electrical power to the wires. Also provided is a circular flange having the second diameter and being integrally coupled to the hose between the top end and the bottom end thereof. As shown in FIG. 4, the circular flange is extended radially outward. By this structure, the hose is adapted to be passed through the top open end of the secondary conduit and further through the secondary and primary conduits and the second pipe. Next provided is a thermostat situated within the central axial interior of the hose adjacent the bottom end thereof. The thermostat has an input connected to the insulated wires. In operation, the thermostat is adapted to allow the transfer of power to an output thereof upon the detection of a temperature below a predetermined degree. Associated therewith is a heating coil coaxially and spirally formed within the hose. As shown in FIG. 4, the heating coil is integral with the hose and is positioned about the central axial interior thereof. The coil extends only between the bottom end and the circular flange. Ends of the coil are connected to the output of the thermostat for radiating heat upon the receipt of power. For facilitating the passing of the hose through the pipe, a lead weight is situated within the central axial interior of the hose between the bottom end thereof and the thermostat. Finally, a hose retainer is provided. The hose retainer includes a cap which is defined by a top circular plate with an aperture formed therein. A periphery of the cap is integrally formed to the plate and has a plurality of threaded grooves formed on an interior surface thereof. This structure is adapted for screwably coupling with the top end of the secondary linear conduit. As best shown in FIG. 3, the hose is situated within the aperture of the cap. As such, the circular flange may be placed against the top open end of the secondary conduit and the cap screwably coupled thereto for preventing water from escaping the conduits.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a electric heating apparatus for de-icing pipes which has all the advantages of the prior art pipe de-icers and none of the disadvantages.

It is another object of the present invention to provide a electric heating apparatus for de-icing pipes which may be easily and efficiently manufactured and marketed.

It is a further object of the present invention to provide a electric heating apparatus for de-icing pipes which is of a durable and reliable construction.

An even further object of the present invention is to provide a electric heating apparatus for de-icing pipes which is susceptible of a low cost of manufacture with regard to both materials and labor, and which accordingly is then susceptible of low prices of sale to the consuming public, thereby making such electric heating apparatus for de-icing pipes economically available to the buying public.

Still yet another object of the present invention is to provide a electric heating apparatus for de-icing pipes which provides in the apparatuses and methods of the prior art some of the advantages thereof, while simultaneously overcoming some of the disadvantages normally associated therewith.

Still another object of the present invention is to obtain a temperature within water pipes when de-icing.

Lastly, it is an object of the present invention to provide a electric heating apparatus for de-icing pipes including a flexible hose with a closed bottom end and a top end. The hose has a pair of insulated wires situated within an interior of the hose and a plug coupled to the top end of the hose. The plug has a pair of contacts connected to the wires and adapted to be inserted within a conventional electrical receptacle for providing electrical power to the wires. By this structure, the hose is adapted to be passed within a the pipe connected to a source of water. Next provided is a thermostat having an input connected to the insulated wires and is adapted to allow the transfer of power to an output thereof upon the detection of a temperature below a predetermined degree. The thermostat is situated within the interior of the hose adjacent the bottom end thereof. Also included is a heating coil formed within the hose, wherein the coil is connected to the output of the thermostat for radiating heat upon the receipt of power. Finally, a lead weight is coupled to the hose at the bottom end thereof for facilitating the passing of the hose through the pipe.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
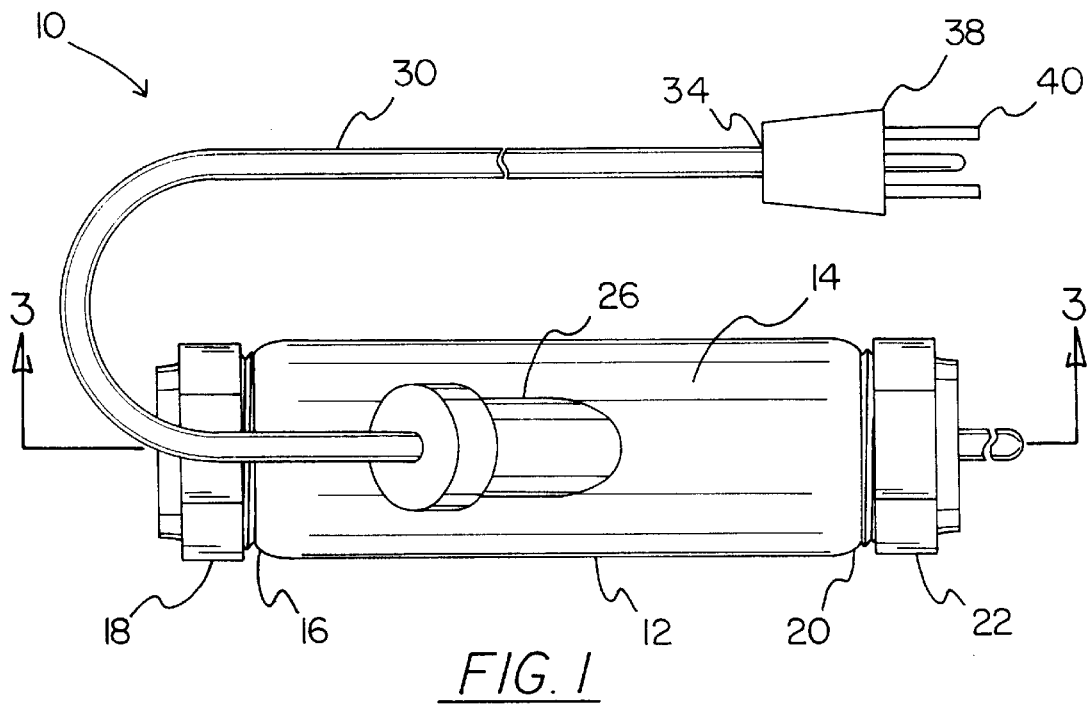
FIG. 1 is a perspective illustration of the preferred embodiment of the electric heating apparatus for de-icing pipes constructed in accordance with the principles of the present invention.
Figure 2:
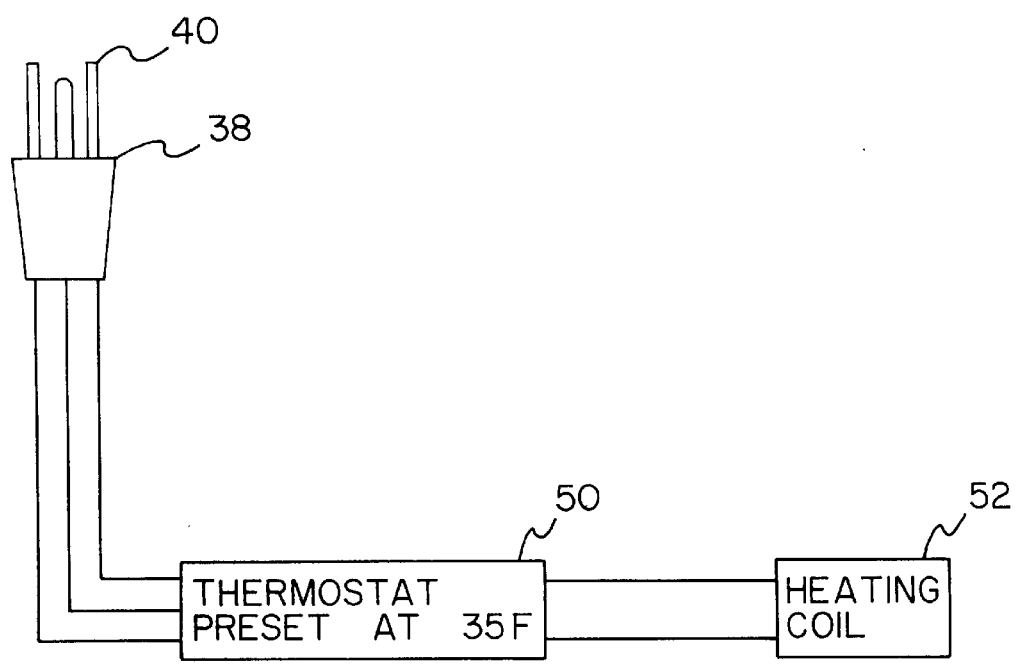
FIG. 2 is a schematic depicting the various electrical components of the present invention and their interconnection.

With reference now to the drawings, and in particular to FIG. 1 thereof, a electric heating apparatus for de-icing pipes embodying the principles and concepts of the present invention and generally designated by the reference numeral 10 will be described.

The present invention, the electric heating apparatus for de-icing pipes, is comprised of a plurality of components. Such components in their broadest context include a housing, hose, thermostat, heating coil, and lead weight. Such components are individually configured and correlated with respect to each other so as to attain the desired objective.

Figure 3:
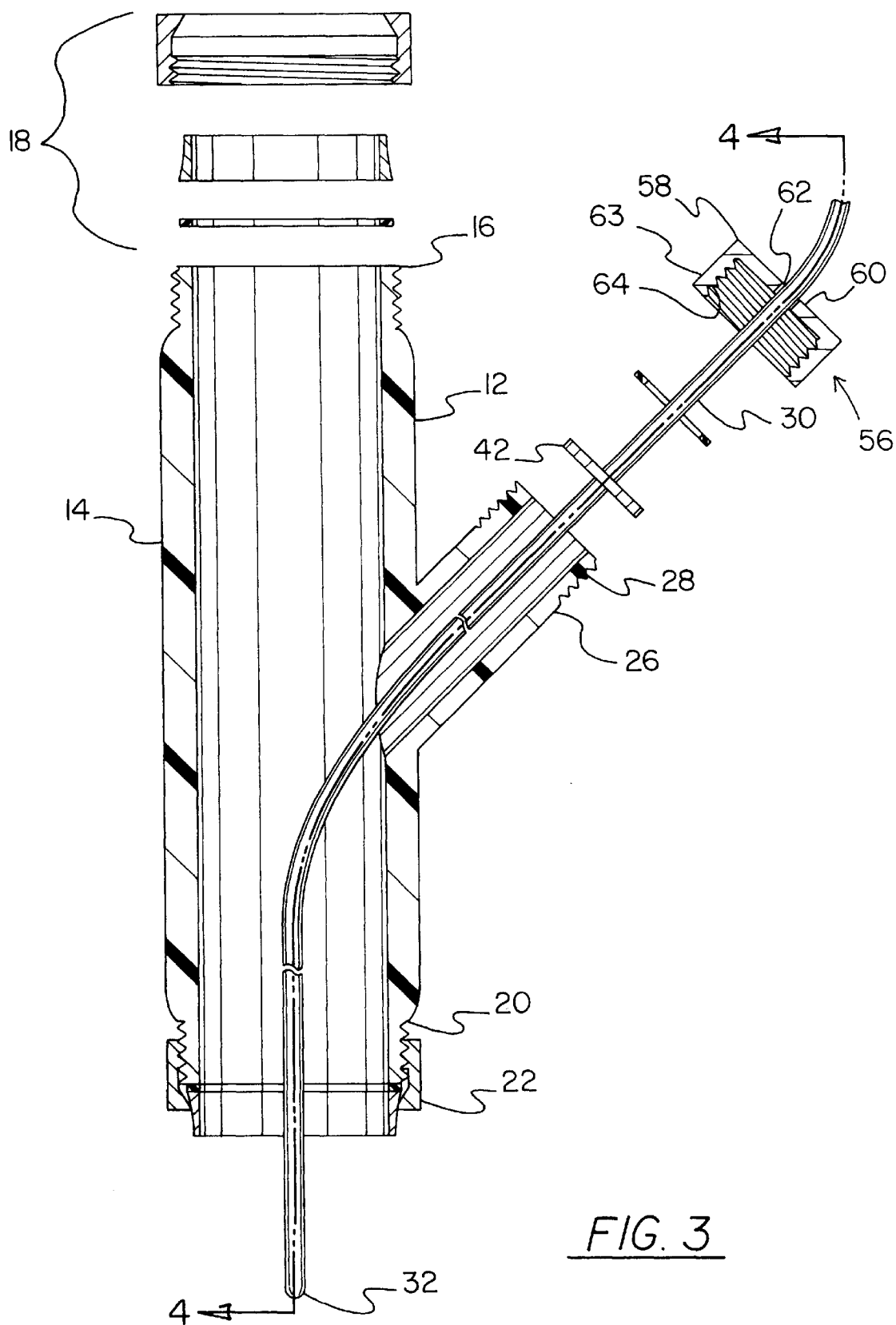
FIG. 3 is a cross-sectional view of the present invention taken along line 3—3 shown in FIG. 1.

More specifically, it will be noted that the system 10 of the present invention includes a housing 12 having a rigid primary linear conduit 14 with a first diameter of 1 inch and a cylindrical configuration. As shown in FIGS. 1 & 3, the primary conduit of the housing has a circular top open end 16 with a first coupling means 18 positioned thereon for coupling to a first pipe. The primary conduit further has a circular bottom open end 20 with a second coupling means 22 positioned thereon for coupling with a second pipe which is in turn connected to a source of water. Details of the coupling means shown in FIG. 3 may be found in U.S. Pat. No. 4,423,311 to Varney, Sr. which is incorporated herein by reference. The primary conduit preferably has a length of about 8 inches. The housing further includes a rigid secondary linear conduit 26 integrally coupled to a central extent of the primary linear conduit and forming an acute angle of preferably 45 degrees with a top portion of the primary linear conduit. The secondary linear conduit has a second diameter less than the first diameter. The second diameter is preferably 15/16 of an inch. An open top of the secondary conduit includes an exterior periphery with a plurality of coaxial threaded grooves 28 formed therein. The secondary conduit is preferably situated 4 inches from the top end of the primary conduit.

Figure 4:
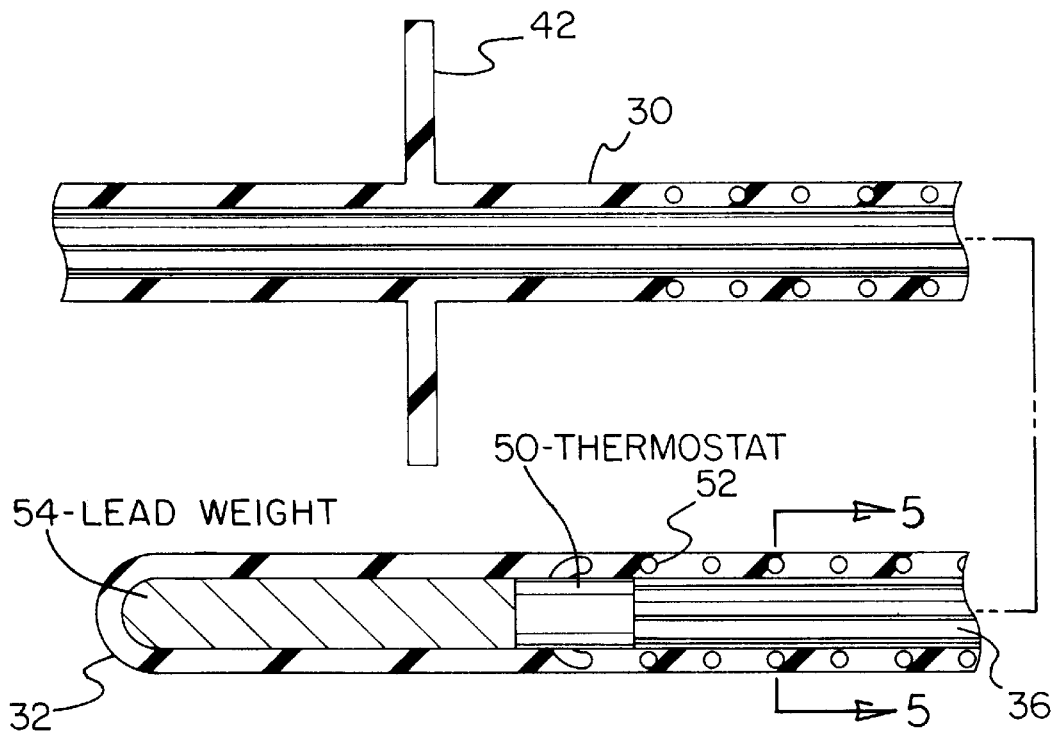
FIG. 4 is a cross-sectional view of the present invention taken along line 4—4 shown in FIG. 3.
Figure 5:
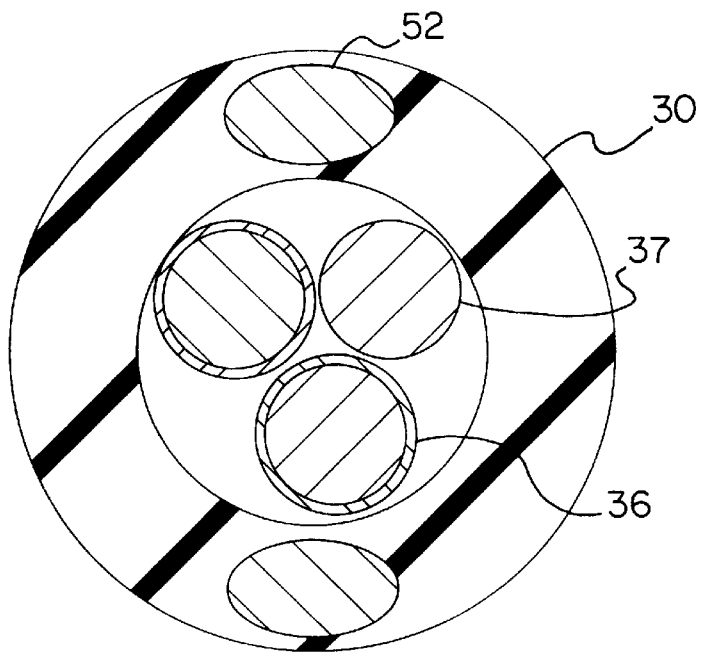
FIG. 5 is a cross-sectional view of the hose taken along line 5—5 shown in FIG. 4.

As shown in FIGS. 3–5, a flexible hose 30 is provided with a closed bottom end 32 and a top end 34. The hose may be constructed to have various lengths. The hose has a pair of insulated wires 36 situated within a central axial interior of the hose and extended from the top end of the hose to a point adjacent the bottom end thereof. In the preferred embodiment, a third wire 37 is situated along the length of the wires 36 for providing symmetric support of the hose. A plug 38 is coupled to the top end of the hose with a pair of contacts 40 connected to the wires. Such contacts are adapted to be inserted within a conventional electrical receptacle for providing electrical power to the wires. Also provided is a circular flange 42 having the second diameter and being integrally coupled to the hose between the top end and the bottom end thereof. As shown in FIG. 4, the circular flange is extended radially outward. By this structure, the hose is adapted to be passed through the top open end of the secondary conduit and further through the secondary and primary conduits and the second pipe. Preferably, the flange is positioned 10 feet from the plug of the hose.

Next provided is a thermostat 50 situated within the central axial interior of the hose adjacent the bottom end thereof. The thermostat has an input connected to the insulated wires. In operation, the thermostat is adapted to allow the transfer of power to an output thereof only upon the detection of a temperature below a predetermined degree.

Associated therewith is a heating coil 52 coaxially and spirally formed within the hose. As shown in FIG. 4, the heating coil is integral with the hose and is positioned about the central axial interior thereof. The coil extends only between the bottom end and the circular flange. Ends of the coil are connected to the output of the thermostat for radiating heat upon the receipt of power. It should be noted that there actually exists two separate spirals which extend along the length of the hose. This is necessary since the coil must be a closed loop.

For facilitating the passing of the hose through the pipe, a cylindrical lead weight 54 is situated within the central axial interior of the hose between the bottom end thereof and the thermostat.

Finally, a hose retainer 56 is provided. The hose retainer includes a cap 58 which is defined by a top circular plate 60 with an aperture 62 formed therein. A periphery 63 of the cap is integrally formed to the plate and has a plurality of threaded grooves 64 formed on an interior surface thereof. This structure is adapted for screwably coupling with the top end of the secondary linear conduit. As best shown in FIG. 3, the hose is situated within the aperture of the cap. As such, the circular flange may be placed against the top open end of the secondary conduit and the cap screwably coupled thereto for preventing water from escaping the conduits.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electric heating apparatus for de-icing pipes comprising, in combination:

a housing including a rigid primary linear conduit with a first diameter and a cylindrical configuration, the primary conduit of the housing having a circular top open end with a first coupling means positioned thereon for coupling to a first pipe and a circular bottom open end with a second coupling means positioned thereon for coupling with a second pipe connected to a source of water, the housing further including a rigid secondary linear conduit integrally coupled to a central extent of the primary linear conduit and forming a 45 degree angle with a top portion of the primary linear conduit, the secondary linear conduit having a second diameter less than the first diameter and an open top with an exterior periphery including a plurality of coaxial threaded grooves formed therein;

a flexible hose with a closed bottom end and a top end, the hose having a pair of insulated wires situated within a central axial interior of the hose and extended from the top end of the hose to a point adjacent the bottom end thereof, a plug coupled to the top end of the hose with a pair of contacts connected to the wires and adapted to be inserted within a conventional electrical receptacle for providing electrical power to the wires, a circular flange having the second diameter and integrally coupled to the hose between the top end and the bottom end thereof with the circular flange and extended radially outward, whereby the hose is adapted to be passed through the top open end of the secondary conduit and further through secondary and primary conduits and the second pipe, wherein a third wire is situated along a length of the insulated wires for providing symmetric support of the hose;

a thermostat situated within the central axial interior of the hose adjacent the bottom end thereof, the thermostat having an input connected to the insulated wires and adapted to allow the transfer of power to an output thereof upon the detection of a temperature below a predetermined degree;

a heating coil coaxially and spirally formed within the hose integral therewith wherein the coil is positioned about the central axial interior of the hose, the coil extending only between the bottom end and the circular flange with the ends thereof connected to the output of the thermostat for radiating heat upon the receipt of power, wherein the heating coil defines a pair of separate spirals extending along a length of the hose;

a lead weight situated within the central axial interior of the hose between the bottom end thereof and the thermostat for facilitating the passing of the hose through the pipe; and a hose retainer including a cap with a top circular plate with an aperture formed therein and a periphery integrally formed thereon with a plurality of threaded grooves formed on an interior surface thereof for screwably coupling with the top end of the secondary linear conduit, the hose situated within the aperture of the cap, whereby the circular flange is placed against the top open end of the secondary conduit and the cap screwably coupled thereto for preventing water from escaping the conduits.

* * * * *